United States Patent [19]
Mansour

[11] Patent Number: 5,122,672
[45] Date of Patent: * Jun. 16, 1992

[54] SURFACE QUALITY ANALYZER APPARATUS AND METHOD

[75] Inventor: Tahir M. Mansour, Livonia, Mich.

[73] Assignee: Ford Motor Company, Dearborn, Mich.

[*] Notice: The portion of the term of this patent subsequent to May 29, 2007 has been disclaimed.

[21] Appl. No.: 578,713

[22] Filed: Sep. 7, 1990

[51] Int. Cl.[5] .................. G01N 21/86; G01V 9/04
[52] U.S. Cl. ................................ 250/571; 356/448
[58] Field of Search ............... 250/571, 572, 559, 562, 250/563; 356/371, 376, 445, 448, 237

[56] References Cited

U.S. PATENT DOCUMENTS

| | | | |
|---|---|---|---|
| 3,794,427 | 2/1974 | Shibata et al. | 356/120 |
| 3,922,093 | 11/1975 | Dandliker et al. | 356/120 |
| 3,977,789 | 8/1976 | Hunter et al. | 356/376 |
| 4,188,544 | 2/1980 | Chasson | 250/560 |
| 4,199,489 | 4/1980 | Short | 260/37 M |
| 4,492,472 | 1/1985 | Asano et al. | 356/376 |
| 4,511,800 | 4/1985 | Harbeke et al. | 356/371 |
| 4,547,073 | 10/1985 | Kugimiya | 356/371 |
| 4,629,319 | 12/1986 | Clarke et al. | 356/237 |
| 4,660,970 | 4/1987 | Ferrano | 356/1 |
| 4,686,374 | 8/1987 | Liptay-Wagner et al. | 250/571 |
| 4,830,504 | 5/1989 | Frohardt et al. | 356/448 |
| 4,853,777 | 8/1989 | Hupp | 358/107 |
| 4,929,846 | 5/1990 | Mansour | 250/571 |

Primary Examiner—Edward P. Westin
Assistant Examiner—John R. Lee
Attorney, Agent, or Firm—Paul K. Godwin, Jr.; Roger L. May

[57] ABSTRACT

Method and apparatus for measuring the quality of a finished surface by projecting a pair of parallel light beams onto the surface and reflecting the beams alongside a reference beam onto an image screen where they are electronically recorded and analyzed against the reference image.

7 Claims, 2 Drawing Sheets

SURFACE QUALITY ANALYZER APPARATUS AND METHOD

RELATED APPLICATION

This is related to U.S. Ser. No. 253,453, filed Oct. 5, 1988, now U.S. Pat. No. 4,929,846.

1. Field of the Invention

The present invention is directed to the field of analyzing the reflective quality of surfaces and more specifically to the area of apparatus and method used to inspect and determine the quality of surface appearance.

2. Background Information

In the automotive and appliance industry where painted surfaces of products need to be inspected, the conventional method used is to pass the product through an area of high intensity light emitted from banks of elongated fluorescent tubes. Human inspectors visually scan the product and look for appearance attributes and flaws such as roughness, gloss, orange peel, waviness, dents and others that contribute to a degraded measure of quality in surface appearance. The inspectors are then able to provide a relative rating of the overall surface quality of each inspected product, based upon their subjective evaluation. While the aforementioned subjective technique may be used by an experienced inspector with some degree of reliability and consistency, it is subject to wide variations between different inspectors, and does not lend itself to high speed applications. Automation techniques are desired to provide a quantitative, rapid and more consistent measure of quality. The high speed and distinctive repeatability are desired to provide a basis for statistical analysis of quality and process control.

My prior invention, described in U.S. Pat. No. 4,929,846 noted above, utilizes a pair of simultaneously projected light beams that are incident onto a test surface and reflected therefrom. The images of the reflected beam patterns are analyzed to determine surface finish quality. Although the apparatus and method described therein provide much more consistent measures of quality for inspected surfaces, there was some requirement for periodic calibration usually requiring placing a calibration surface (such as an optically smooth glass surface) in the test surface position in order to provide a reference for subsequent measurements.

SUMMARY OF THE INVENTION

The present invention is an improvement of my earlier invention since it provides a constant reference line image from a calibration surface against which the reflected line images from the test surface are compared. Since the constant reference line image derives from a reflection by a built-in optically smooth glass surface, it provides the means for automatic calibration for each and every measurement. This improvement utilizes a laser-based optical projection apparatus to produce a profile image of a test surface that is being evaluated. The profile image has been found to contain readily discernable representations of physical features on a surface which are relevant to its appearance quality. The apparatus generates a pair of light beams that are directed toward the test surface and are parallelly incident thereto. One of the beams is incident onto an optically flat surface beam splitter. The reflected portion of the split beam becomes a reference beam which impinges on a screen as a reference line image. The portion of the split beam passing through the beam splitter continues towards a test surface. The incident light is both dispersed and reflected from the test surface. The two beams reflected from the test surface impinge upon a light dispersing screen below the reference line image. All three are imaged by a video camera and electronically processed. The images appearing on the screen constitute a reference line and profiles of the test surface. By comparing variations in the line images, the distance between the images, thickness of the line images, curvatures and other comparative features, the electronics attached to the video camera detects and identifies those features. The identified features are then analyzed by an appropriately weighted algorithm to produce a numerical index which is configured to correlate with a human inspection expert's visual assessment of the overall surface quality, having been previously calibrated.

It is an object of the present invention to provide an apparatus and method for projecting a pair of light beams onto a test surface and imaging the reflected beams alongside a reference image for quality analysis.

It is a further object of the present invention to provide a projection apparatus and method in which a pair of diverging light beams are simultaneously directed to a test surface in a parallel arrangement and are imaged onto a light dispersing screen alongside a reference image for comparison through electronic means.

It is a further object of the present invention to provide a projection apparatus and method in which a pair of diverging light beams are directed to a test surface in a parallel arrangement and imaged onto a dispersing screen along with a reference image from a built-in calibration surface. The images are recorded and analyzed to give a measure of the quality of the test surface with reference against predetermined levels of quality.

DETAILED DESCRIPTION OF THE PREFERRED EMBODIMENT

Figure 1:
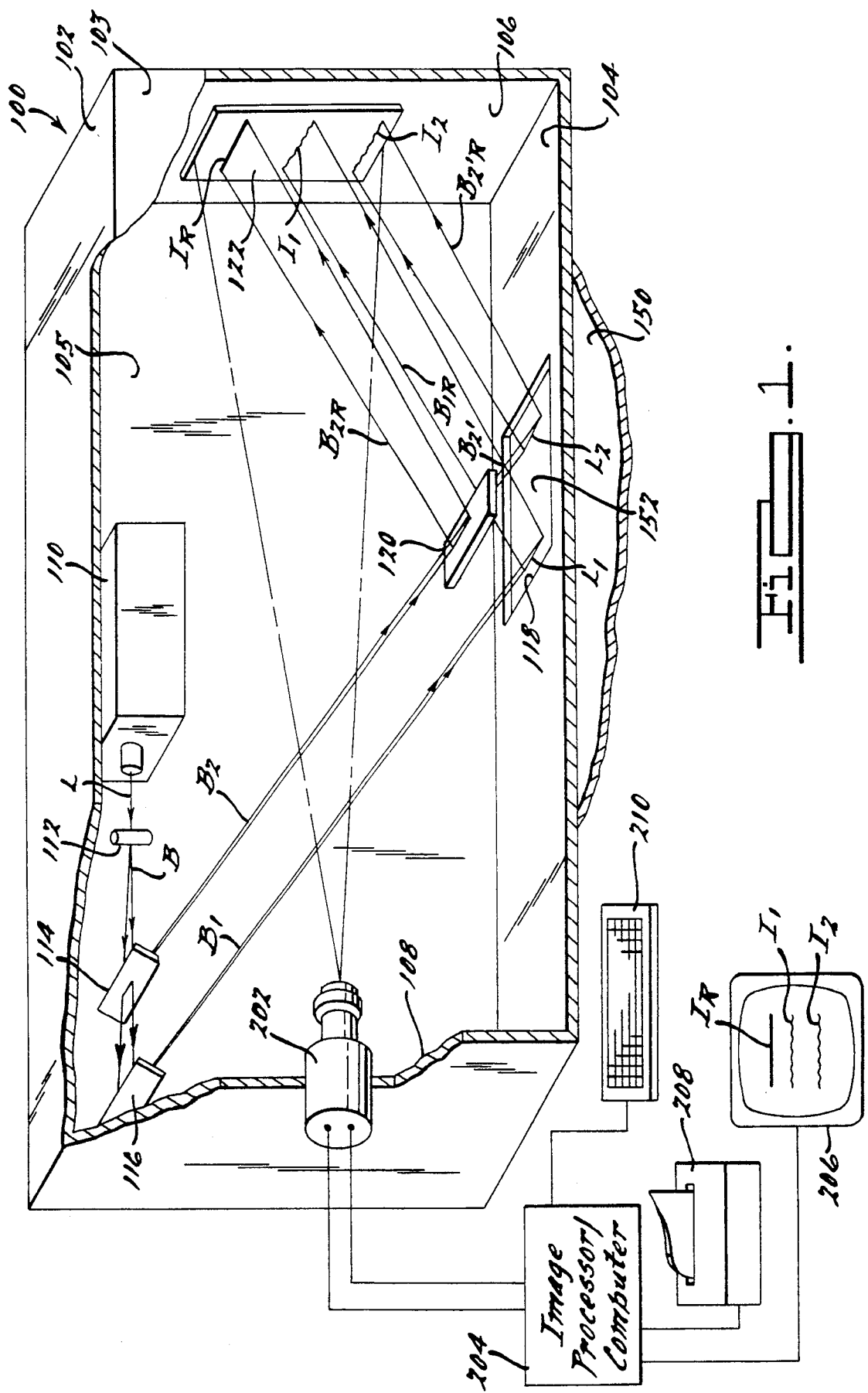
FIG. 1 is a perspective cutaway view of the housing which contains the components of the preferred embodiment of the invention.

The embodiment of the invention shown in FIG. 1 includes a substantially light-tight housing 100 shown in a partial cutaway view. Housing 100 includes a top 102, a bottom 104, end panels 106 and 10B and side panels 103 and 105. The bottom 104 includes a rectangular aperture 118 through which simultaneously projected lines of light $L_1$ and $L_2$ are incident onto an area 152 of a test surface 150 underlying the housing 100.

A laser 110 is enclosed within the housing 100 and generates a collimated monochromatic pencil beam L. The pencil beam L impinges on a cylindrical lens 112 where it is caused to be diverged in a single plane as a fan beam B. A first partially reflecting planar mirror 114 serves to transmit a first portion of the beam B and reflect a second portion towards the opening 118.

A second planar mirror 116 is located in line with the first portion of beam B transmitted through partially reflecting mirror 114. The planar mirror 116 is angled substantially the same as planar mirror 114 so that it reflects a diverging beam $B_1$ in a plane parallel to $B_2$. A second partially reflective mirror (beam splitter) 120 is attached between side panels 103 and 105 in a position to interrupt diverging beam $B_2$. Partially reflective mirror 120 serves as a reference surface from which a reference beam $B_{2R}$ is reflected. Reference beam $B_{2R}$ is a reflected portion of beam $B_2$. The portion of $B_2$ transmitted through beam splitter 120 is designated as $B_2$, and it lies in a plane that is generally parallel to $B_1$. Beams $B_1$ and $B_2$, are both directed to the area defined by the open aperture 118 in the bottom of the housing 104 and impinge upon an area 152 of the test surface 150. Beams $B_1$ and $B_2$, are projected onto the surface 152 as line beams $L_1$ and $L_2$ at an acute angle of incidence that is preferably greater than 45° (measured from the normal to the surface 152). The light is reflected from the test surface 152 as $B_{1R}$ and $B_{2'R}$ and is dispersively imaged onto a screen 122 as respective images $I_1$ and $I_2$ below reference image $I_R$ from reference beam $B_{2R}$. Depending upon the unevenness, the dispersing characteristics, the curvature and other properties of the test surface effecting the light, the respective images $I_1$ and $I_2$ will vary. However, the reference image $I_R$ remains a uniform intensity straight line of constant width because of the constant optical surface of the beam splitter 120.

The screen 122 on wall 106 is preferably a white planar surface that has uniform light dispersion characteristics and is generally nonabsorbent of the light energy. A video camera 202 is mounted in wall 108 directly across from wall 106 and contains a lens which is focused upon the screen 122 in order that it may record the images $I_R$, $I_1$ and $I_2$ appearing on the screen 122. The output of the video camera 202 is connected to an image processor/computer 204 that contains peripherals such as a video monitor 206, a printer 208 and a keyboard 210.

In operation, the more closely the properties of the surface area 152 of the test sample 150 are to a planar mirror, the images $I_1$ and $I_2$ will appear on the screen 122 parallel to $I_R$ with a predetermined separation and approximate two line images without significant width. However, as dispersion characteristics are present in the surface 152, those characteristics will result in the images $I_1$ and $I_2$ appearing as thicker lines. Dents or curvatures in the test surface 152 will affect the shapes and spacing of the images $I_1$ and $I_2$. (Separate and distinguishable intensity levels for beams $B_1$ and $B_2$ may be provided in order to correspondingly distinguish images $I_1$ and $I_2$ with respect to each other.) In essence, the images $I_1$ and $I_2$ are profiles of the surface 152 and the variations in the images $I_1$ and $I_2$ from straight lines are detectable and measurable.

The image processor/computer 204 is programmed utilizing various test samples having known reflective properties inspected with the projector apparatus and compared with the subjective ratings of a human expert utilizing conventional techniques. Utilizing appropriate algorithms, and samplings at different areas of the surface 150, an overall quality measure can be obtained in a printed form through the printer 208 with a rating that will correspond to that provided by a human expert.

Figure 2:
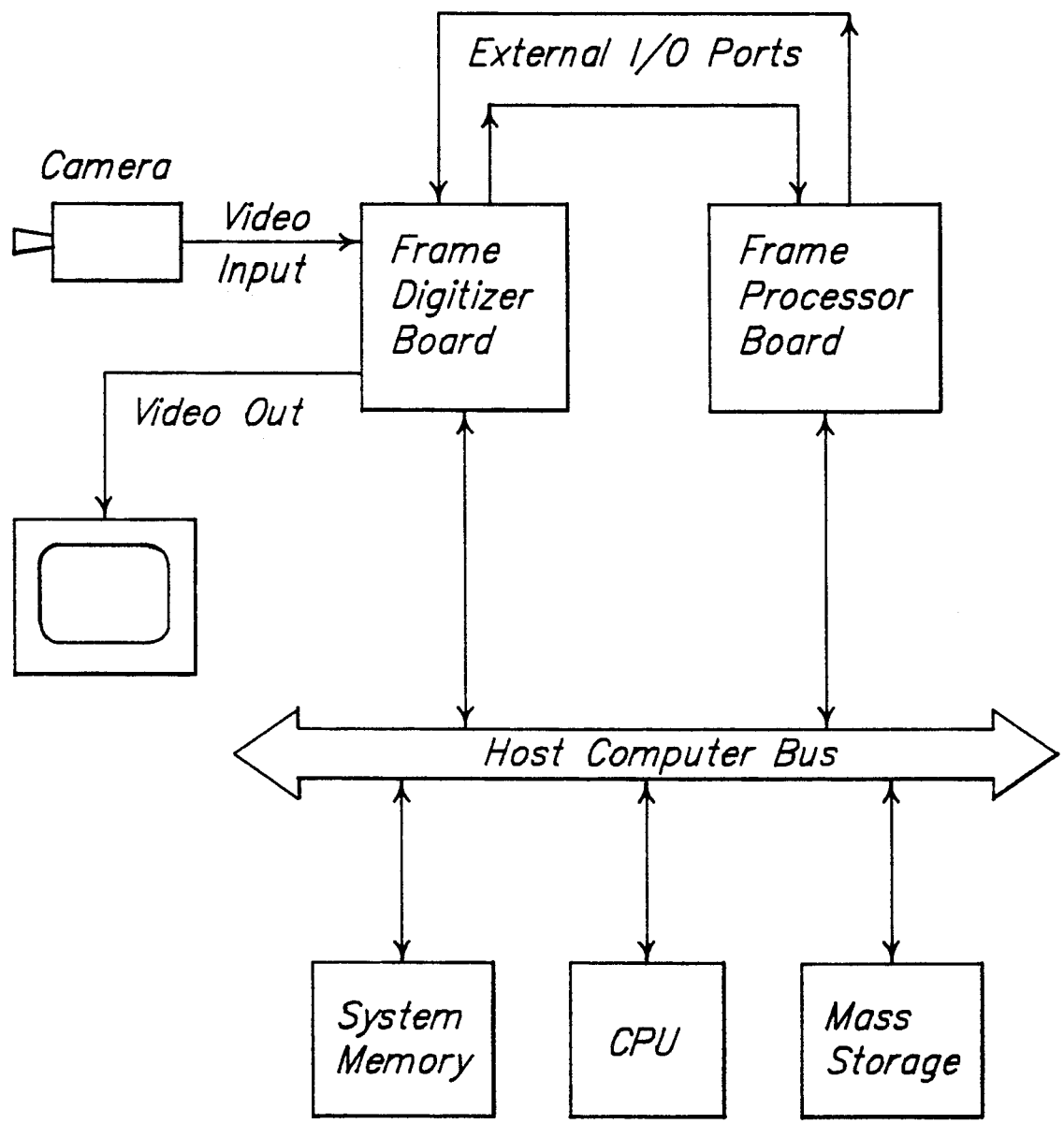
FIG. 2 is a block diagram of the image processing portion of the invention.

As indicated in FIGS. 1 and 2, the image that is electrically recorded by the video camera is provided to the image processor/computer 204. A Frame Digitizer Board converts the analog video to a digital signal. The digitized image is provided to a Frame Processor Board where filtering and enhancement eliminates noise. The computer section is programmed with appropriate algorithms to analyze the filtered and enhanced images and, in view of previous analysis made by a human inspection expert, provides a numerical quality measure to the operator.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. An apparatus for simultaneously projecting a pair of monochromatic light beam onto a test surface and imaging the light reflected from the test surface for quality analysis, comprising:

means for generating a collimated beam of monochromatic light energy;

means for diverging said collimated beam in a single plane, splitting said diverging beam onto at least three beams, directing first and second beams of said three beams toward said test surface and forming the remaining one of said three beams as a reference beam;

means for providing a housing for mounting said generating means and said diverging, splitting and directing means in a predetermined orientation and including an opening through which said first and second beams can impinge as incident beams upon a test surface located adjacent said housing;

screen means located within said housing for imaging said reference beams and the monochromatic light of said first and second beams reflected from said test surface; and means for recording the images on said screen means and analyzing the recorded images to categorize the quality of the test surface against predetermined levels of quality.

2. An apparatus as in claim 1, wherein said generating means is a laser.

3. An apparatus as in claim 2, wherein said diverging, splitting and directing means includes a cylindrical lens located in the path of said beam from said laser, a first partially reflective mirror to reflect a first portion and to transmit a second portion of said diverging beam from said cylindrical lens, a planar mirror to reflect said second portion of said diverging beam transmitted by said first partially reflective mirror as said first incident beam in a plane substantially parallel to said first portion reflected by said first partially reflective mirror, and a second partially reflective mirror with an optically flat surface for splitting said first portion into a reference beam reflected toward said screen means and into said second incident beam transmitted toward said test surface in parallel with said first incident beam.

4. An apparatus as in claim 3, wherein said diverging beams are of distinguishably different intensity levels.

5. An apparatus as in claim 3, wherein said first and second incident beams are directed to said test surface at an acute angle as parallel lines of light energy.

6. An apparatus as in claim 5, wherein said screen means is an opaque planar surface having uniform light dispersing characteristics and being substantially nonabsorbent of the light energy.

7. An apparatus as in claim 5, wherein said parallel lines of light energy are of different and distinguishable intensity levels.

* * * * *